United States Patent [19]

Rosenbeck et al.

[11] 4,418,266

[45] Nov. 29, 1983

[54] WELDING SYSTEM FOR CONTOUR JOINTS

[75] Inventors: William H. Rosenbeck, Torrington; Frederick Eckart, Southington; Francis C. Gerath, Collinsville, all of Conn.

[73] Assignee: United Technologies Corporation, Hartford, Conn.

[21] Appl. No.: 313,412

[22] Filed: Oct. 21, 1981
(Under 37 CFR 1.47)

[51] Int. Cl.³ .............................................. B23K 9/12
[52] U.S. Cl. .......................... 219/137 R; 219/124.34; 219/125.1
[58] Field of Search .......... 219/125.1, 125.11, 124.34, 219/137 R; 364/513; 318/574; 414/1

[56] References Cited

U.S. PATENT DOCUMENTS

| | | | |
|---|---|---|---|
| 3,119,009 | 1/1964 | Zeller | 219/125.1 |
| 3,757,125 | 9/1973 | Okada et al. | 219/124.34 |
| 4,014,495 | 3/1977 | Oda et al. | 219/125.1 |
| 4,118,871 | 10/1978 | Kirkham | 33/174 |
| 4,151,394 | 4/1979 | Cecil | 219/124.34 |
| 4,156,125 | 5/1979 | Brown | 219/124.02 |
| 4,229,642 | 10/1980 | Sakurai et al. | 219/125.1 |
| 4,255,643 | 3/1981 | Balfanz | 219/125.1 |

FOREIGN PATENT DOCUMENTS

1437481  5/1976  United Kingdom ............ 219/125.1

Primary Examiner—C. C. Shaw
Attorney, Agent, or Firm—C. G. Nessler

[57] ABSTRACT

Apparatus for welding a workpiece using a gas tungsten welding arc and filler wire has three machine elements mounted on a base, to provide x, y, and z motions of a carriage part. A welding head is mounted on the carriage and is adapted to move in the z vertical direction and rotate without limitation, relative to the movable carriage. Thus, the head has five independent motions. The workpiece is mounted on a holder which provides x, y, and rotational motion beneath the welding head, to reposition the workpiece between actual welding operations. The apparatus which is controlled by two small computers is adapted to weld complex shaped workpieces.

10 Claims, 10 Drawing Figures

WELDING SYSTEM FOR CONTOUR JOINTS

TECHNICAL FIELD

The present invention relates to the field of arc welding, most particularly to machines adapted for arc welding of complex workpieces.

BACKGROUND

Arc welding is an efficient manufacturing process for the fabrication of complex structures. However, the utility of such structures is particularly dependent on the quality of the weld. Because of the low weight and close design margins demanded by the aerospace industry, welding quality requirements are particularly stringent in structures used in aircraft engines, aircraft, and spare vehicles. Also, because of high refinement in structural design, it is quite common that irregular and otherwise complex shapes are encountered. These shapes present particular problems since the quality of the weld is generally dependent upon the constancy of welding parameters.

There are many welding processes and the sensitivity of the weld quality to particular parameters varies amongst them. The present invention will be seen to be particularly useful for welding processes which include gas tungsten arc (GTAW), gas metal arc (GMAW) and plasma arc welding (PAW). These processes are particularly suited for welding superalloys where appreciable quantities of filler material must be added. Filler material is needed in welds whenever there is less than the most perfect fitup between the faying surfaces, and to insure a positive weld reinforcement. When filler metal is added, it is usually added by means of feeding a wire into proximity of the arc fusion zone. Under such conditions, the quality of the weld will be dependent on the rate of filler metal addition, the arc voltage and current, and the positioning of the arc welding head over the joint, and other parameters.

Figure 1:
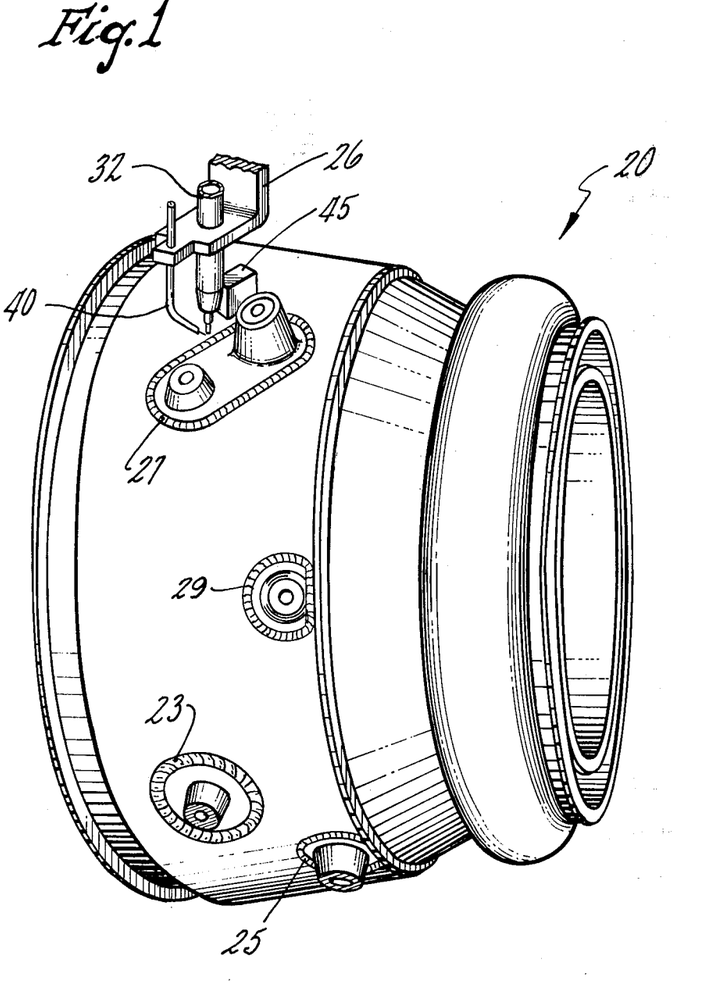
FIG. 1 is a perspective view of a gas turbine diffuser case together with a portion of the welding apparatus used in its fabrication.

As described in the preferred embodiment herein, a diffuser case for a gas turbine as shown in FIG. 1, is a particularly complex structure. Such structures are forged from superalloy and then machined for use; they have various bosses where fittings and the like are attached. These bosses represent thicker areas of the case wall, and rather than making an extra heavy forging which would require extensive machining, the bosses are welded to the wall of the case, as shown in the Figure. It is seen that many of the bosses are irregular in shape and thickness, and lie at different positions along the tapered and curved outer surface of the case. Because of the geometrical problems these bosses have traditionally been welded manually using GTAW and hand-fed filler rod. The process is labor intensive and the welds are prone to having defects whenever there is a small operator deviation. Such defects may be located by radiographic inspection, and they may be repaired by grinding out the weld and rewelding, but such a process is extremely expensive.

Conventional welding machines overcome such operator problems, but they are adapted mostly to welding regular shaped workpieces. For example, Cecil U.S. Pat. No. 4,151,394 illustrates a typical system wherein vertical and horizontal motion of the welding head are obtained. Brown U.S. Pat. No. 4,156,152 discloses plasma arc welding wherein the torch is moved about the x and y axes, in the plane of the workpiece, to follow the weld joint; z axis motion, perpendicular to the plane of the workpiece is used to maintain a desired spacing between the torch and the workpiece. Control of the vertical position is obtained by sensing the arc voltage.

While these motions in the x, y and z directions are known and appear applicable to welding structures such as the aforementioned diffuser case, in fact they are insufficiently sophisticated. This is due to the unusual configuration and requirements for welding of the diffuser case, as are described in more detail below. One aspect includes the need to use GTAW welding to obtain superior quality. As compared to the GMAW process, where the electrode is consumable, in GTAW the filler wire must be separately introduced in front of the weld arc. Thus, when two complete passes around a boss lying on a surface are required, the weld head and connected wire feed unit must rotate at least 720°; with about 810° to include slope out of the weld current. In the GMAW process, such requirements are not encountered, and therefore the prior art equipment is inadequate to the present need. Another aspect in diffuser case welding is the need to closely control parameters, including arc voltage, current, and so forth. As reference to the figures herein will show, the surface of cases is contoured. The wall and boss thicknesses vary, as well. Also, as the case thermally expands during welding, it affects the diameter of the case, and thereby the weld head to workpiece distance. Thus, the critical arc length parameter may vary. Accordingly there is a need for sophisticated control of the welding apparatus motions, to obtain the best weld joint.

SUMMARY OF THE INVENTION

An object of the invention is to provide for improved arc welding of very complex structures, in a manner which is adaptable to different configurations.

According to the invention, a workpiece such as a diffuser case, is welded using an arc welding process with filler wire feeding. The gas tungsten arc welding (GTAW) process is preferred but other welding processes may be used in substitution. In the best mode of the invention a welding head with an affixed wire feed unit and gas trailer is movably mounted on a carriage. The head is adapted to move along the z axis direction, and to rotate in a c direction about a z axis with respect to the carriage. The carriage is movably mounted on a base which also receives the workpiece; it is adapted to move along the x, y, and z axes. The motions of the head and carriage are controlled in a coordinated manner by a central computer control system which acts on drivers and actuators.

In operation, the carriage moves along a path in the x, y, and z axis directions, to cause the head to follow the trace of the weld joint. The head has a second motion along the z axis, relative to the carriage (designated z' axis motion herein). This motion is additive to the primary z axis motion of the carriage, and enables precise arc length control. In addition, the head with its affixed wire feed unit and gas trailer rotates about the z' axis in a programmed fashion, so that the wire feed and trailer devices do not contact any parts of the workpiece, thus achieving wire deposition into the arc from in the front of its travel direction and gas shielding of the weld on the opposite or trailing side of the arc.

In a more complex embodiment of the invention, there are in addition means for rotating and tilting the workpiece about the x and y axes. For larger workpieces, means for moving the workpiece along the x and y axes are provided. Thus, after the completion of a weld, the workpiece may be repositioned to facilitate the welding of a second boss. These motions are preferably controlled by the computer processor system described below, but of course they may be carried out manually in simpler embodiments.

In the best embodiment of the invention, the z' motion of the head and arc voltage, arc current, gas flow and wire feed, are controlled by a system which includes a microprocessor (MCP). A separate microcomputer numerical control system (MNC) controls the motion of the carriage in all directions, the motion of the head in the rotary direction, and the MCP itself.

A further embodiment of the invention includes the use of a laser tracing system prior to actual welding. The laser beam is directed along a z axis parallel to the z axis along which the welding head translates, but offset therefrom. Before initiating the welding arc, the operator of the machine commands the carriage to execute its preprogrammed trace of the weld path, but at an offset in the x-y plane, equal to the offset which the laser beam has with respect to the z axis of the welding head. By visually observing the bright spot of the beam impingement, the operator can determine if the path of the machine program and weldment configuration are properly mated. If they are not, the operator may change the instructions to the control system to obtain the proper weld path motion. Thereafter, the control system for the carriage is commanded to undertake the sequence which, in coordination with the motion of the head, accomplishes the weld.

The aforementioned apparatus is adaptable to a variety of weldment configurations and produces welds which are uniform and superior in quality.

BEST MODE FOR CARRYING OUT THE INVENTION

The preferred embodiment is described in terms of welding a diffuser case for a gas turbine engine, but it will be seen that it is also useful in welding analogous structures.

FIG. 1 shows a diffuser case 20 which has a tapered and generally conical shape. Spaced about the exterior of the case are bosses 23, 25, 27, 29. These varied shape bosses have a greater average thickness than the walls of the diffuse case into which they are welded, as they serve the purpose of providing for the reinforced attachment of pipes and other structures. Furthermore, as may be seen for boss 29, in some instances their location is such as to make difficult circumscribing during welding because of the exterior surface features of the diffuser case. Also shown in the figure are portions 26,32 of the welding apparatus which is discussed below.

Figure 2:
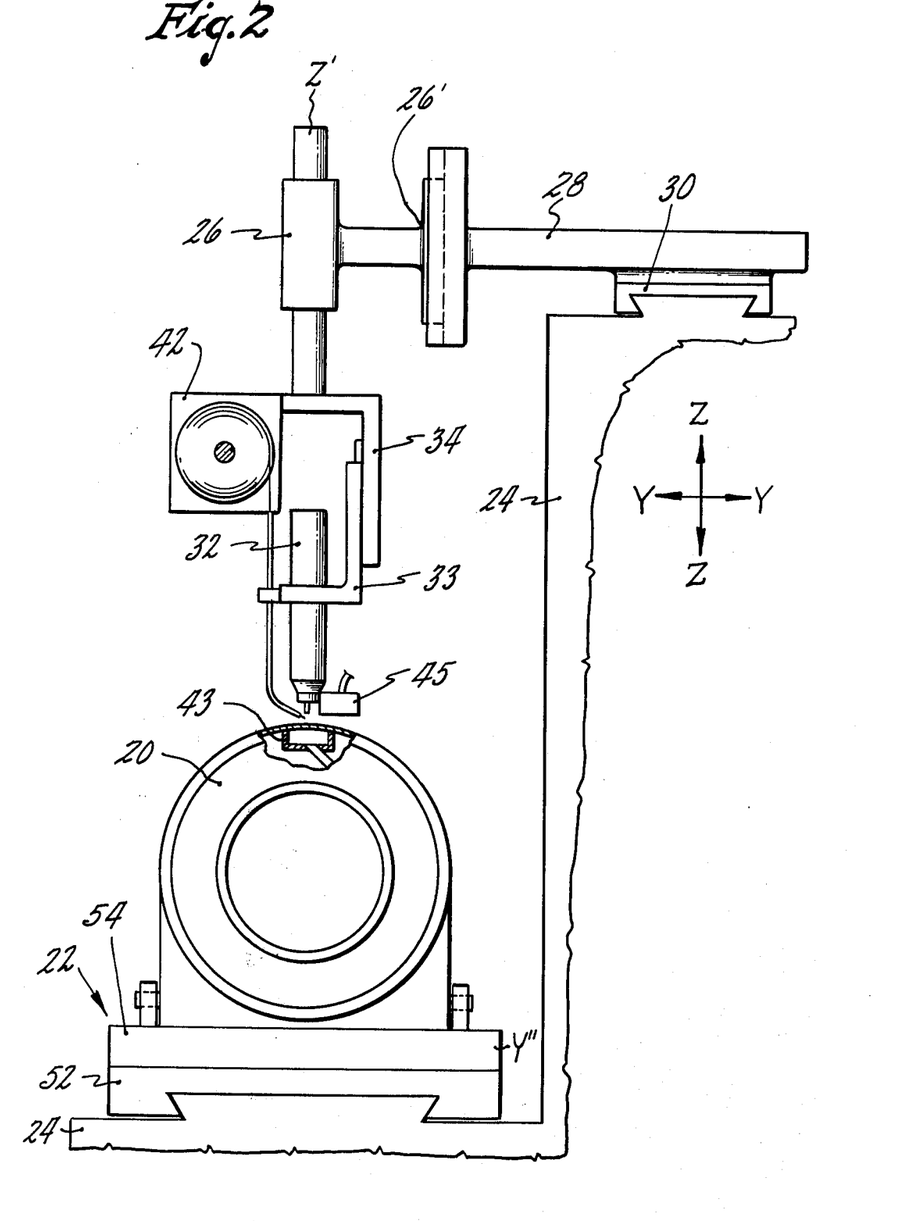
FIG. 2 is an elevation view of the welding apparatus.
Figure 3:
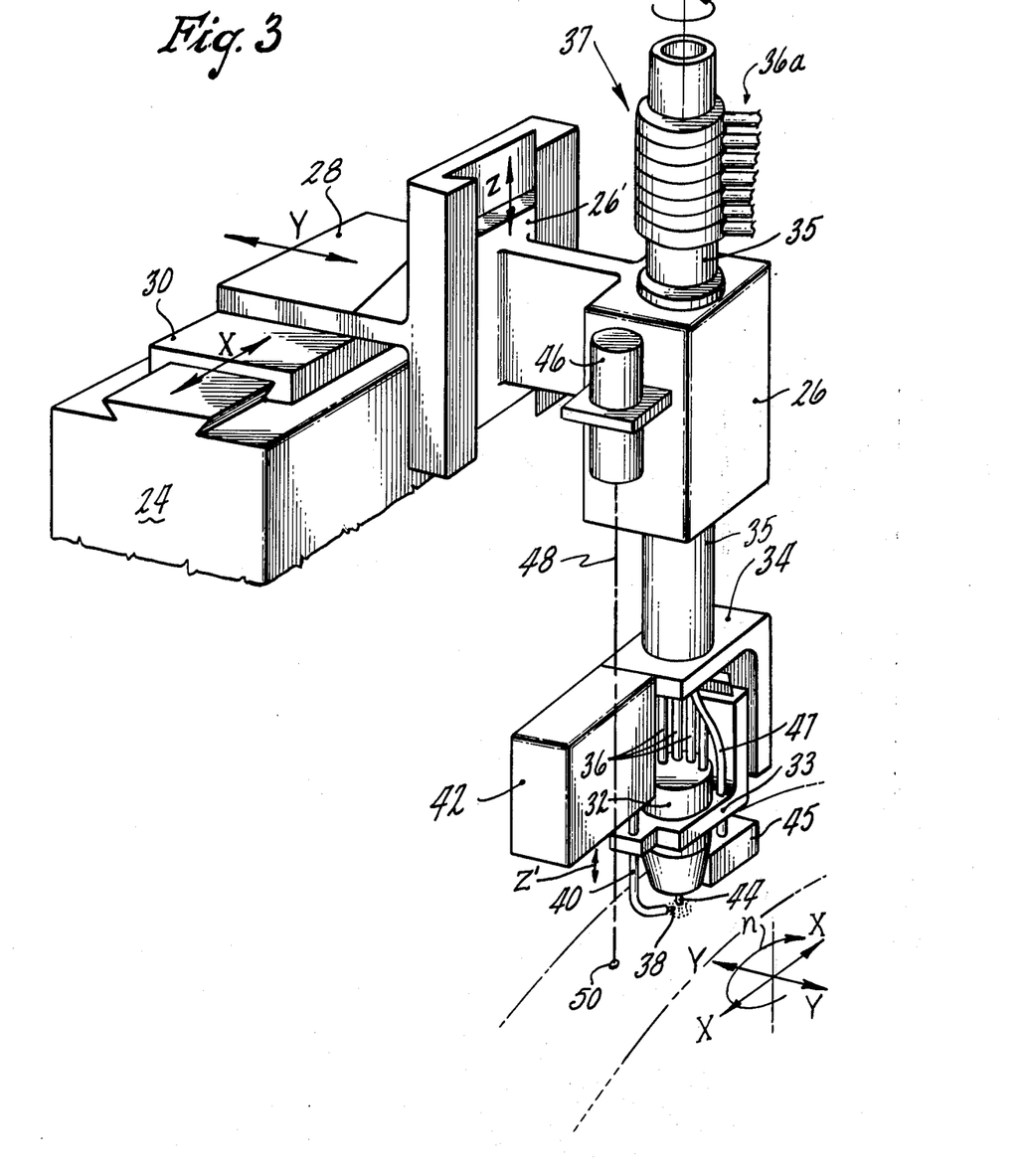
FIG. 3 is a perspective view of the upper drive system of the apparatus shown in FIG. 2.
Figure 4:
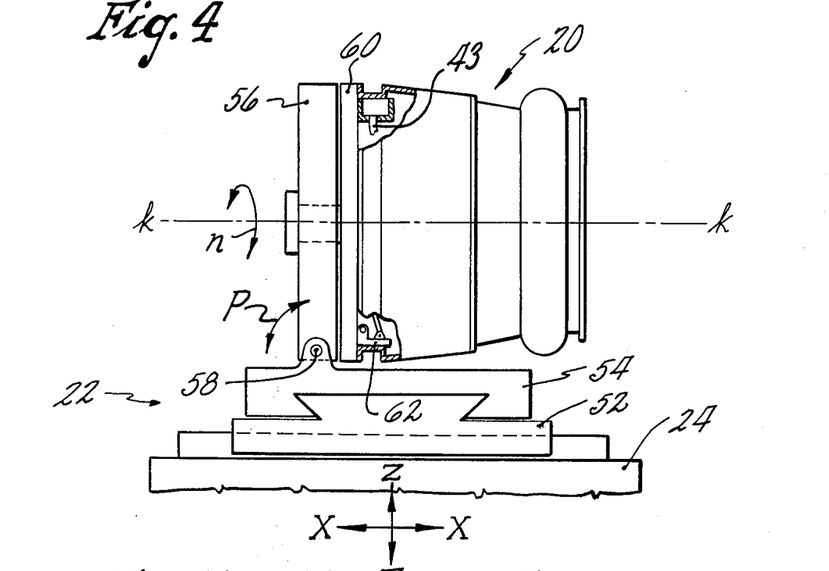
FIG. 4 is a side elevation view of workpiece holder and lower drive system.

FIG. 2 shows in elevation the apparatus used for welding the bosses, while FIG. 3 shows in perspective parts of the same apparatus. FIG. 4 shows a more detailed view of the workpiece holder. Referring to the Figures, the workpiece 20 is mounted in a holder 22 which rests on a base 24. Also mounted on the base is first movable slide member 30, upon which is mounted second movable slide member 28, upon which is mounted the end 26' of movable carriage 26. The foregoing elements are adapted to move respectively along the mutually orthogonal axes x, y, z as shown, using conventional machine ways, by which they are attached to the part on which each is mounted. The motions of the elements 30, 28, 26 (and 33 described below) are controlled by actuators, such as motor driven ball screws, servo-controlled hydraulic cylinders, or the like, omitted from the figures for clarity of the more important features of the invention.

Figure 5:
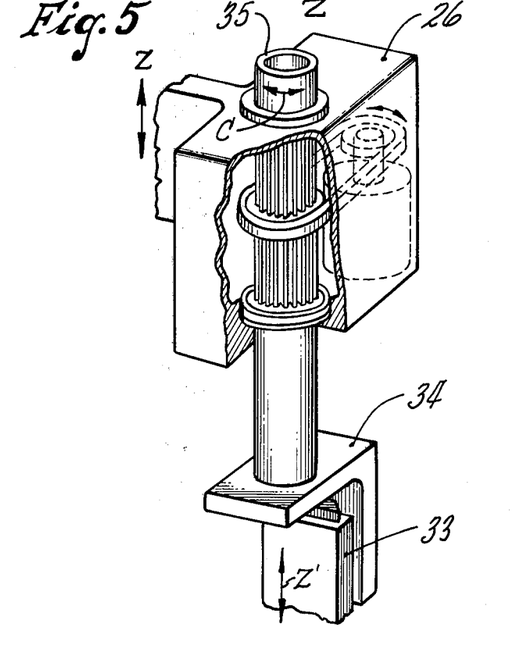
FIG. 5 shows a detail of the upper drive system.

The welding head 32 is fixedly mounted in a L-support 33 which is slidably mounted on a machine slide portion of bracket 34, thus enabling vertical motion of the head. Bracket 34 has a shaft portion 35 which is rotationally mounted in the carriage 26. FIG. 5 shows in more detail how the weld head has both vertical motion, called z' motion (simply motion along a particular z axis) and rotational motion about the z' axis (called hereinafter "c" motion) both with respect to the carriage.

In synopsis, the z axis distance between the welding head and the workpiece may be varied by motion of the carriage 26 with respect to the slide element 28, as well as by z' motion of the L support 33 with respect to the carriage 26. The significance of the c motion is described below.

Referring to FIG. 3, the welding head, which is of the conventional GTAW type, but may be of other analogous configuration, is aligned with the z' axis. Filler wire 38 is fed through wire feed tube 40 from wire feed unit 42 which is attached to the L support. The wire feed unit 42 is a conventional commercial device having a variable speed drive responsive to an appropriate command signal. The wire feed tube 40 is fixedly mounted to the L support 33, as is the welding head. Consequently, the wire 38 will be introduced into the arc zone 44 from a particular orientation with respect to the welding head which itself is non-polar. The orientation at which the wire is introduced with respect to the x-y axes, or the track of the weld joint, may be altered by rotation of the bracket 34 about the axis z'. Affixed to the welding head is a gas trailer 45 into which inert shielding gas is introduced by pipe 47. Typically, this on the opposite side of the head from the wire feed unit, as it is adapted to protect the hot weld from oxidation until it cools. It will be seen that rotational motion of the bracket 34 and head will alter the position of the trailer, in the same manner as described for the wire feed. Both the wire feed and the trailer must be positioned close to the weld joint. Thus, they will tend to contact any nearby weldment protrusions unless proper rotation of the head is accomplished.

The electrical current, cooling water, head gas, shield gas, and activation signals to the wire feed unit, are all fed to the head through leads 36 which pass through the hollow central portion of shaft 35, through slip ring type devices 37 and make external connections with lines 36a. Accordingly, the bracket 34 and the welding head can rotate freely about the z' axis in the c mode without limitation on the degrees of rotation.

Fastened to the side of the carriage 26 is a laser source 46 which projects a beam 48, parallel with the z and z' axes, toward the workpiece. The beam will strike the workpiece at a point 50 which will be offset from the point of impingement of the arc 44 by a known distance along the x-y axes. The functioning of the laser beam is described further below.

FIG. 4 shows a side view of the workpiece holder 22. A first machine slide element 52 is adapted to move in the x axis direction along the base 24 upon which it rests. A second machine slide element 54 is mounted on the element 52 and is adapted to move thereon in the y direction. A vertical support 56 rotates to desired secured positions by rotating about pivots 58 on element 54. A circular workpiece table 60 is rotatably fastened to the vertical support 56. Clamps, such as air clamp 62, are fixed to the rotary table 60 to hold the diffuser case 20. Actuators, not shown, such as ball screws, hydraulic cylinders, or other like devices are provided to move the elements 52, 54, 56, 60 to predetermined positions before welding commences. The workpiece holder elements and actuators are characterized hereinafter as the lower drive system, while the previously described system acting to move the head is called the upper drive system.

The first rotary motion of the table 60 is about an axis k—k which is perpendicular to the surface of the vertical support 56. When the support is perpendicular to the base, it is simply a particular axis parallel to the x axis of the base. The rotary motion of the table about the k—k axis is characterized as n rotation. Motion of the vertical member 56 about the pivots 58 produces what is characterized as p rotation.

Motion of the n type will be used to circumferentially place the weld joints generally under the location of the head in coordination with x-y motions of the holder. In the use of the invention, there is a preferred degree of n and p rotation, and resultant orientation of the case with respect to the base. Preferably a weld joint will be centrally positioned in the x-y plane at the mean location of the head. This will be generally achieved when the uppermost surface of the diffuser case, where it is to be welded, is generally tangent to the x-y plane. When so positioned, the minimum z motion of the welding head is required as it traces its weld path.

From FIG. 4 and the foregoing description, the motion of the holder will be seen to position the workpiece suitably under the welding head. In practice, where the configuration of the diffuser case 20 is not often changed, it will be found not necessary to have such a complex holder. Somewhat simpler fixtures may be specially provided to position specific parts properly with respect to the base 24. Generally, it has been found desirable to at least provide for the rotary motions of the table 60 and the support 56. Of course, the rotation of the case enabled by the table 60 may be provided on a fixed table simply by releasing the clamps, and repositioning the diffuser case 29 by manual n rotation. If the upper drive system will preferably have substantial x and y travel, the slides providing such motion in the workpiece holder may be omitted, except where the workpiece dimensions exceed the upper system capabilities.

Referring now to FIG. 2, it is often desirable to provide shielding gas to the underside of the weld, as by shoe 43. The shoe is fixed to the workpiece prior to welding, to protect the entire area to be welded. The gas supplied to the shoe is usually supplied in conjunction with that provided to the trailer 45.

There are two unusual features of the apparatus. First, there is the combination of movements which are possible in the z direction. The primary z axis motion, enabled by the carriage movement, causes the weld head to generally follow the contour of the weld joint. The secondary z' axis motion permits the fine control of the spacing between the workpiece and the welding head electrode which is necessary to obtain close voltage control. The automatic control of voltage by movement of the welding head has been known heretofore, but not in combination with additional z axis motion and the other motions described. The combination used in the invention ensures greater flexibility and precision while welding very contoured surfaces. Second, the bracket supporting the welding head is configured to allow any number of degrees of rotation, thereby enabling the more than 720° rotation necessary to make two passes around a boss. Of course in prior welding systems without wire feed or trailer gas shielding there has been no need to rotate the welding head, since there is no directionality to the welding head. Generally, only about 360° of motion has been possible, and to make a two pass weld, two separate cycles have been necessary.

In the use of the invention, the workpiece is clamped to the circular table so that the boss location to be welded is generally aligned in the x-y plane which is most vertical, that is, most near the welding head. The vertical member 56 and the holder as a whole are adjusted to accomplish this, as previously described. Next the machine is commanded so that the carriage moves in the x-y plane, to cause the laser beam 48 to trace out the weld path. In doing this the head moves along the path of the intended weld joint at an offset distance equal to the distance between the axis of the laser beam and the z' axis, which is the axis of the head. During this motion, the operator observes the laser beam spot on the workpiece, and verifies that the machine motion is correctly programmed for the weld joint.

Next the machine is commanded to accomplish the weld. A summary will be given here; then a more detailed description. Finally, the manner in which the automatic control is accomplished will be described.

In welding, the head moves from a "home" or base reference position, to the starting point on the weld joint line, by motions of the first slide 30 and second slide 28, and the vertical motion of the carriage 26 along the z axis. Once the arc is established, the z' axis motion of the L-support 33 is superposed on the z axis motion of the carriage, to maintain an essentially constant distance between the electrode of the welding head and the workpiece. It does this by sensing of the arc voltage which is maintained at a set point value. Thus, as the head moves simultaneously in the x and y axes to trace out the weld path, there is superimposed z and z' axis motions, owing to the cylindrical contour of the workpiece and changing z axis location of the weld joint. During the welding operation the current, gas flow to the head, gas flow to the trailer 45, and feed rate of the wire 38, are controlled according to a preset schedule by a microprocessor MCP. The MCP is commanded regarding the initiation and cessation of the welding arc just mentioned parameters by the microcomputer MNC. Both are described in more detail below.

Inasmuch as the boss is raised above the general cylindrical surface contour of the workpiece, the welding head must rotate as it traces its path, elsewise the wire feed tube 40 and trailer 45 would be prone to mechanically interfere with the boss. Accordingly, there is during the x,y,z, and z' axis motions, an additional c rotation about the z' axis. Of course, while it may be said that all these motions are simultaneous, it should be apparent that they will be both simultaneous and serial, as required to trace the particular contour of the boss. The welding operation may be accomplished in a single pass, or as is preferred in thicker structures, by two or more passes, to obtain the optimum weld structure without undue heat input, according to choices familiar to those skilled in welding. After a particular boss has been welded, the head is withdrawn from the vicinity of the workpiece by suitable z axis motion, and returned to its x, y, z home position. Then, the workpiece is repositioned by, as necessary, n and p rotation, and x and y axis motions of the holder 22.

Figure 6:
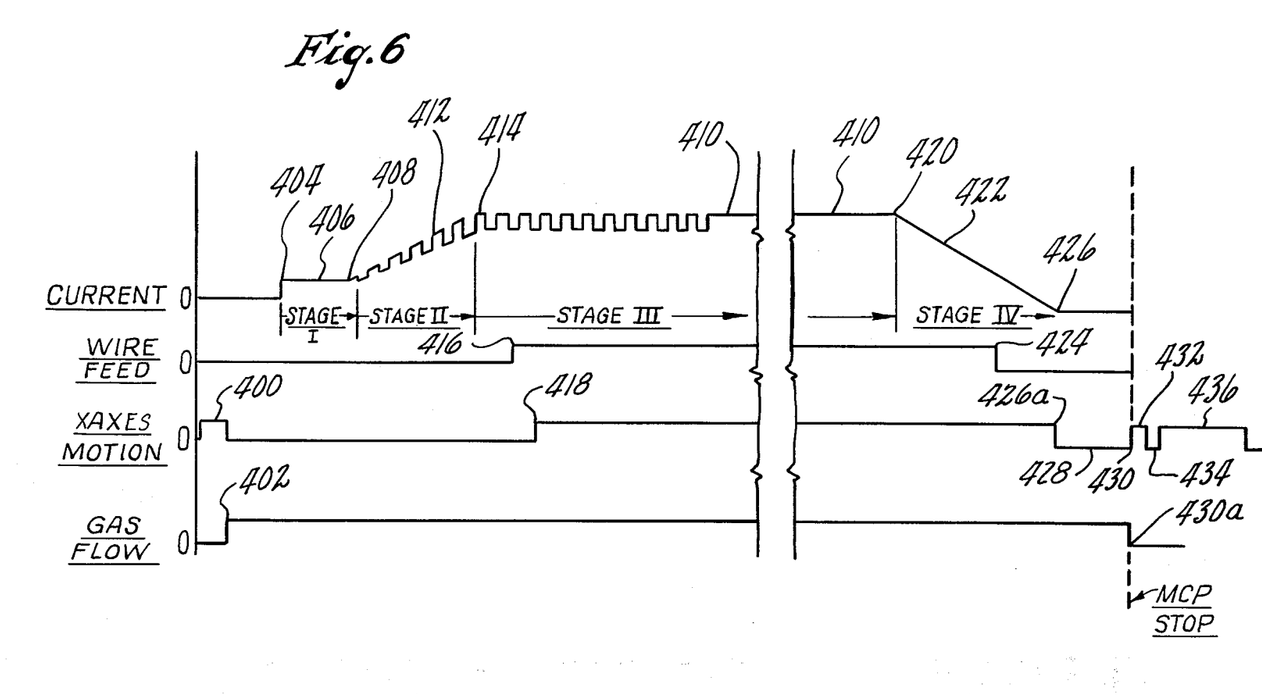
FIG. 6 schematically illustrates the interrelation of certain weld parameters.

Referring now to FIG. 6, the behavior of certain parameters during the automatic welding mode of operation are shown. These parameters include current, filler wire feed, motion of the x, y, z and c axes and gas flow to the welding head. In the figure the condition of the parameters is individually illustrated according to time. The figure shows that initially the MNC causes motion 400 of the axes, during which time the welding head is moved from its home position to the starting point of the weld, just above the workpiece. Next the actual welding cycle starts as the MCP becomes active and gas flow initiates at point 402, to purge the head trailer and shoe gas lines, to provide the desired atmosphere in the vicinity of the weld prior to the initiation of the arc. Next, at point 404, the current flow is initiated, as a voltage is applied to the welding head electrode, and and the head moves with z' motion to cause the electrode to touch, and then quickly withdraw from the workpiece. (Touch-starting is used instead of the more conventional superimposed high frequency current, to avoid interference with the electronic devices associated with the invention). The current is then established at an amperage or current level 406, during a time period generally referred to in the figure as "stage I". After the arc is stabilized, at point 408, the current is caused to increase progressively to the primary current level 410. The current is increased according to a predetermined program, during stage II, as illustrated by the sloped line 412. Thereafter, at point 414, the current reaches the primary level, and stays at this primary this general level during stage III.

FIG. 6 shows the current pulsating during stage II. Whether the current pulsates or not is a matter of choice, according to the weld parameters which are desired. When the pulsed weld current is not desired, it is alternately operated at a "constant" mode, as illustrated in the latter part of stage III, where the Figure shows pulsed mode followed by a constant mode. This change from pulsed to constant mode is for illustration purposes only; typically, the current would be operated at either a constant or pulse mode during the entire cycle. Once the current reaches its primary level at point 414, and becomes stabilized at the 410 level, the filler wire feed is started at point 416, after a short delay. Shortly following the action at point 416, the motion of the torch is started at point 418 according to the predetermined x,y,z, and c motions which are desired.

At point 414, the automatic voltage control (AVC) z' motion of the welding head is allowed to become active. This will cause maintenance of a constant arc length, according to the voltage set point which is programmed into the AVC unit. The current flow is determined by a conventional control system associated with the welding power supply.

The welding parameters are sustained until the weld is completed. In FIG. 6, these parameters are shown as steady state conditions. Of course, if the thickness of the workpiece varies, and there are other variables associated with the weld, the parameters would be programmed to vary during the course of stage III operation. When the weld path has been completed, at point 420, the automatic voltage control is deactivated, and the current is caused to down slope along the path 422, during stage IV. The down slope path will be that which experience shows is necessary to produce a sound weld, it being well known that a sudden termination of the current would tend to produce shrinkage or porosity. When the current decays below a certain level, at a point 424 the wire feed is ceased. When the current reaches zero at point 426 and the arc is extinguished, the carriage motion is stopped as well, as indicated at point 426a. Referring now to the axes' motion, during the ensuing period marked 428, there is no motion, but the gas flow is maintained to provide protection from the environment for the weld which is still cooling. When sufficient cooling has been achieved, the gas flow is terminated, at point 430a. At this point the weld is complete, and the MCP performs no further function. The MNC then momentarily reactivates the AVC and causes it to return to its home position, as indicated by period 432. After a momentary pause 434, the axes motion is resumed at 436, to cause the welding head to return to its home position, from whence it started.

Figure 7:
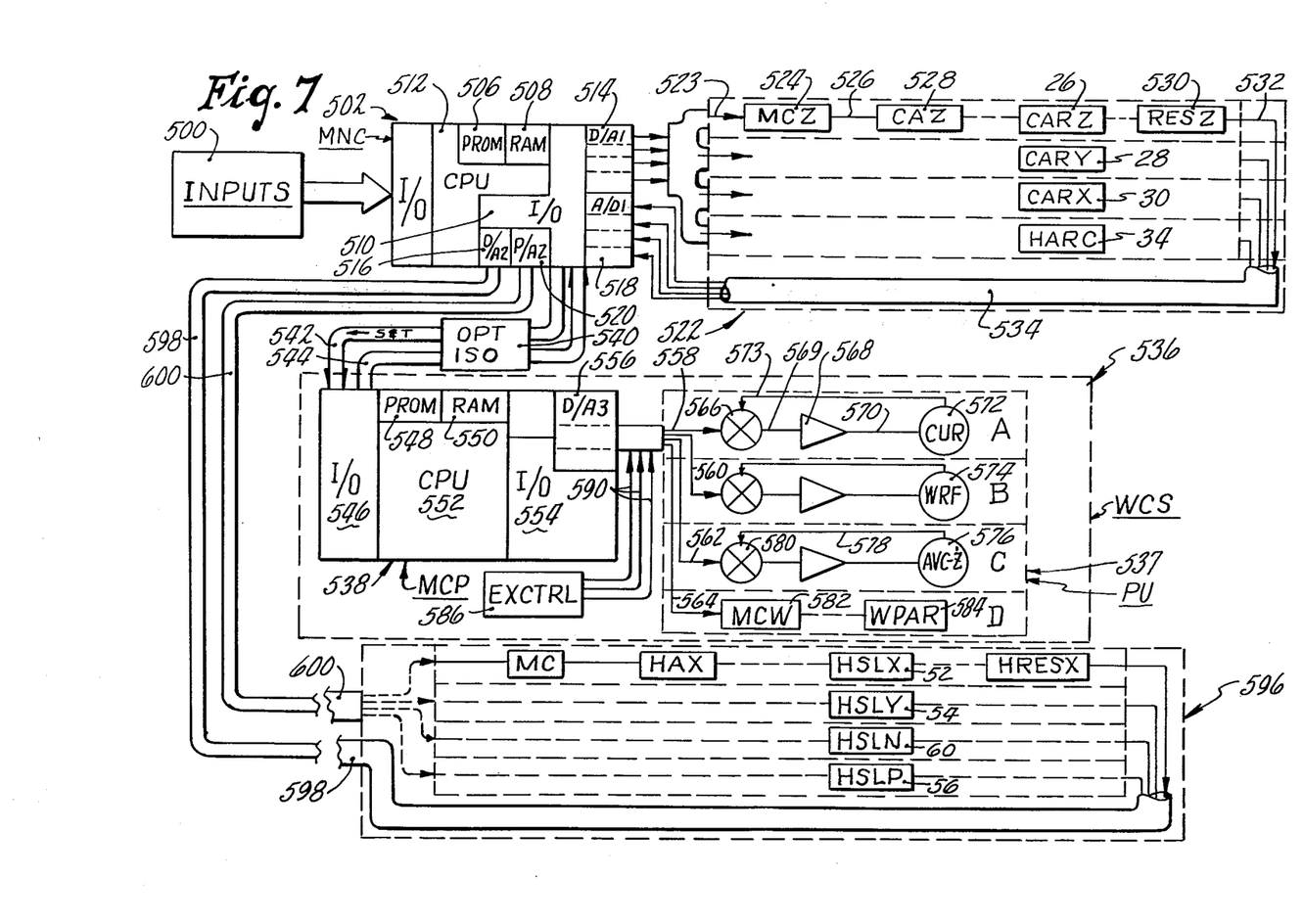
FIG. 7 schematically illustrates the components and control units of the invention.

FIG. 7 shows in summary fashion the control system which is used in the practice of the invention. Inputs 500, such as from paper tape, a keyboard, or from analog sources, are transmitted to a microcomputer numerical control unit MNC 502. Contained within the MNC unit are an input-output unit I/O, 504, for receiving the inputs 500, memories PROM 506 and RAM 508, for storage of data and program; central processing units CPU 512; a second input-output unit 510; multiple first and second analog to digital converters arrays D/A1 and D/A2, 514, 518; first and second digital to analog converters arrays A/D1 and A/D2, 516, 520, the arrays having numbers sufficient to communicate with the several motors and external loads as elaborated on below.

The MNC unit preferably used in the invention is an Actrion III microcomputer numerical control system (McDonnell Douglas Corporation, St. Louis, Mo.; it is more complex than the illustrative MNC unit described above. It features multiple block buffer storage, linear path interpolation, and circular path interpolation. It is adapted to three axis control, and incorporates multiple microcomputers, each performing designated tasks. Computational software, including control programs, machine logic, and control diagnostics, is stored in nonvolatile programmable read-only memory. The MNC features a programmable machine interface, to eliminate the use of conventional interface relays. A servo monitor system monitors actual machine velocity error. The MNC also includes a safety monitor to disable the machine tool if the MNC fails in an unsafe mode.

The first converters 514, 518 send and receive signals to and from the upper drive system 522, which acts to produce the carriage motion in the x,y, and z directions (by acting on carriage slides CARX, CARY, CARZ, 30, 28, 26 respectively), and the c rotation, by acting on the bracket HARC 34, to which the head is attached.

The functioning of the several components of the upper drive system is exemplified by the elements which contain the CARZ component. Signals from the D/A1 of the MNC unit are received by the motor controller MCZ 524 through lines 523. The MCZ unit, which may be an electric power modulator or a servo valve, in turn provides a signal through line 526 to the actuator CAZ 528 which may be an electric motor or a hydraulic cylinder. The CAZ actuator is mechanically connected to the carriage CARZ 26 which is adapted to move along the z axis. Connected to the CARZ slide is a resolver RESZ 530 which outputs a signal through line 532, and trunk 534, back to the MNC unit at A/D1 unit 518.

The MNC processor unit also manipulates the weld parameter system WCS 536 which carries out major parts of the actual arc welding. Within the WCS system 536 are a processor MCP 538 connected to the MNC processor through an optical isolator OPTISO 540, located in lines 542, 544, and a power unit PU 537. In overview terms, the MCP processor contains first input-output unit I/O 546 for communication with the MNC memories PROM and RAM, 548, 550, and a central processor CPU 552. There is a second input-output I/O 554 and digital to analog converter units D/A3 556. Signals from the D/A3 units are transmitted by lines 558-564, to control certain weld parameters, as shown schematically within power unit PU 537, by way of channels A-D. The power unit PU 537 preferred in the use of the invention is an Astro-Arc E7-300-S4 unit (Astro Arc Co., Sun Valley, Calif.), which is adapted to provide up to 300 amperes continuous current, adjustable arc voltage, and filler wire feed rate, according to commands from the MNC or manual controls on the power unit. Defined herein as being included in the PU 537 are three closed loop servo systems, for controlling the welding current, the wire feed rate, and the arc voltage. These are illustrated within channels A, B, and C of the PU.

The MCP processor unit of the WCS system is preferably a microcomputer controller Model MCP-1601 of the Astro-Arc Co. It is an emulator and input-output device that commands from the MNC to emulate the controls in the PU, associated timer cards, relays, and other power unit logic systems. As an example, weld parameters manually set on the PU can be duplicated by the MNC acting on the MCP in the automatic mode, according to tape commands to the MNC. The operator of the welding system has no real input to the MCP, other than through the MNC, except for system off, reset, run, and the data input keyboard. The MCP receives S&T word inputs from the MNC by trunk line 542, and outputs analog voltages to the servo-systems of the PU by lines 558-564. The MCP will interpret data fed into it and do all timing, levels, and delays necessary to perform the proper welding sequences.

The control of the weld parameters by the MCP in channels A-C is exemplified by the closed loop servo system in channel A. In channel A, the elements 566-572 interact to control welding current. A set point signal is provided by the MCP on line 558 to summer 566. Summer output is transmitted by line 569 to amplifier 568 and thence by line 573 to the current controlling load unit CUR 572 within the transformer-rectifier of the power unit. The output arc current is sampled and a proportional signal fed by line 574 back to the summer.

In like manner, channels B and C of unit 537 are utilized to control the rate of wire feed from the unit WRF 574 and the head to workpiece spacing, through z' motion, by action of drive motor AVC-Z' 576, which actuates L-support 33. Channel B wire feed servo operates similarly and comprises a DC permanent-magnet motor with tachometer feedback. Channel C maintains the head-to-workpiece distance by sensing the arc voltage during actual welding. A signal responsive to the voltage is transmitted by line 578 to summer 580. The result is continuous control of voltage by automatic maintenance of the requisite spacing between the electrode of the GTAW head and the workpiece.

Channel D is representative of multiple other channels (not shown). By a signal through line 564, servo-mechanism MCW 582 is utilized to electromechanically control one of several welding parameters WPAR 584, such as gas flow to the welding head, the trailer, or the shoe, cooling water, and other parameters incidental to complete and safe welding. There is generally no need for feedback loops in this functions although they may be added for added safety and precision.

The PU output may optionally be controlled external to the automatic control system, as by standard controls and logic EXCTRL 586, which may provide input by lines 590 directly to the input signal lines 558-564 of power unit 537 (with appropriate disconnect of the MCP, not shown). This feature permits easy experimental change of parameters, or override. Similarly, a remote hand held console (not shown) may be utilized to enter instructions to the MCP, to enable the operator to easily start/stop the program cycle while he visually observes the welding.

The lower drive system 596 is similar in configuration and operation to the upper drive unit, connected to the MNC at D/A2 and A/D2 by lines 598, 600. In the lower drive system are mechanical first and second (x and y) elements HSLX and HSLY, 52, 54, as well as actuators which provide for n and p rotation of the table and vertical support, HSLN 60 and HSLP 56. The manner of control and feedback is similar to that set forth for the upper drive unit and thus will not be repeated.

Figure 8A:
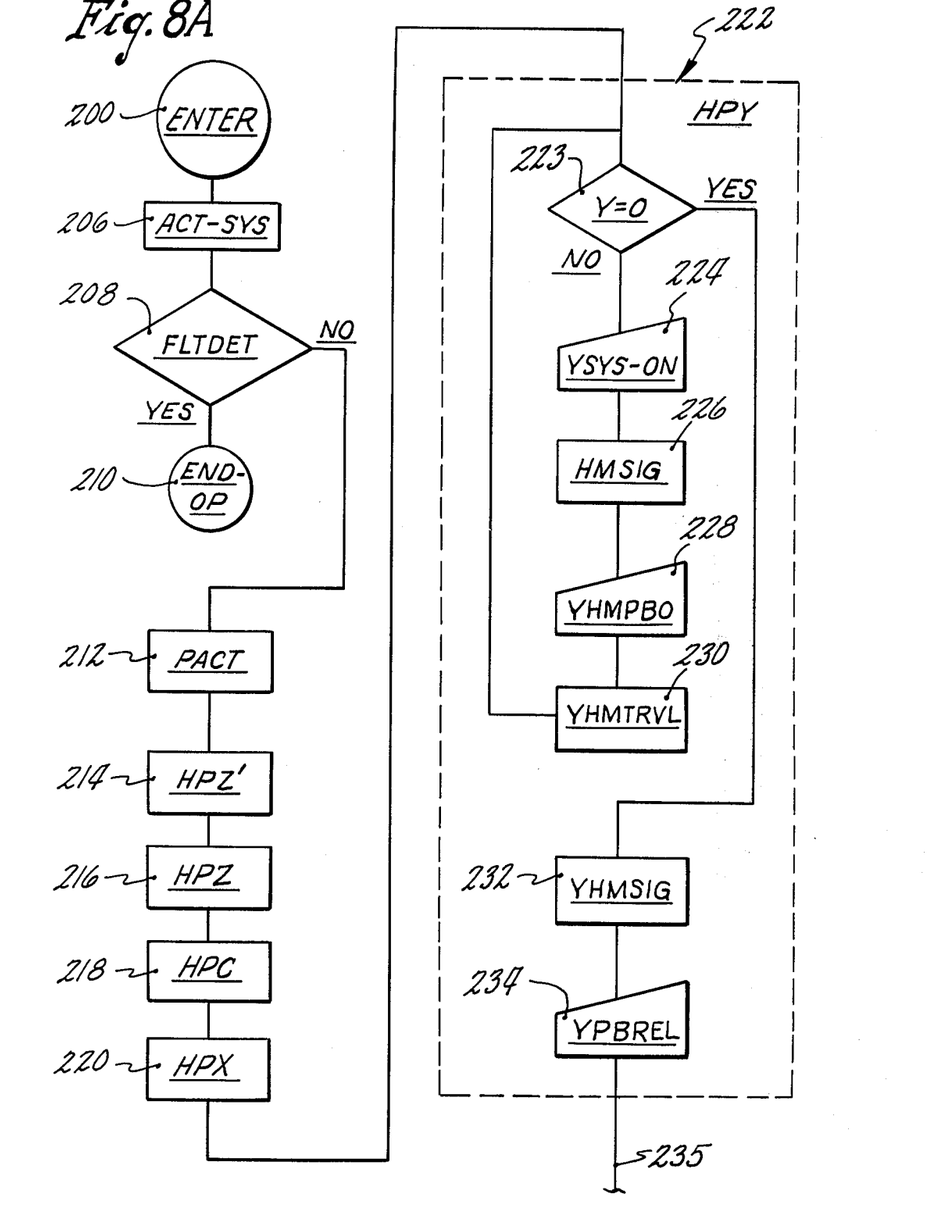
FIG. 8 is a flow chart showing the functioning of the processors.
Figure 8B:
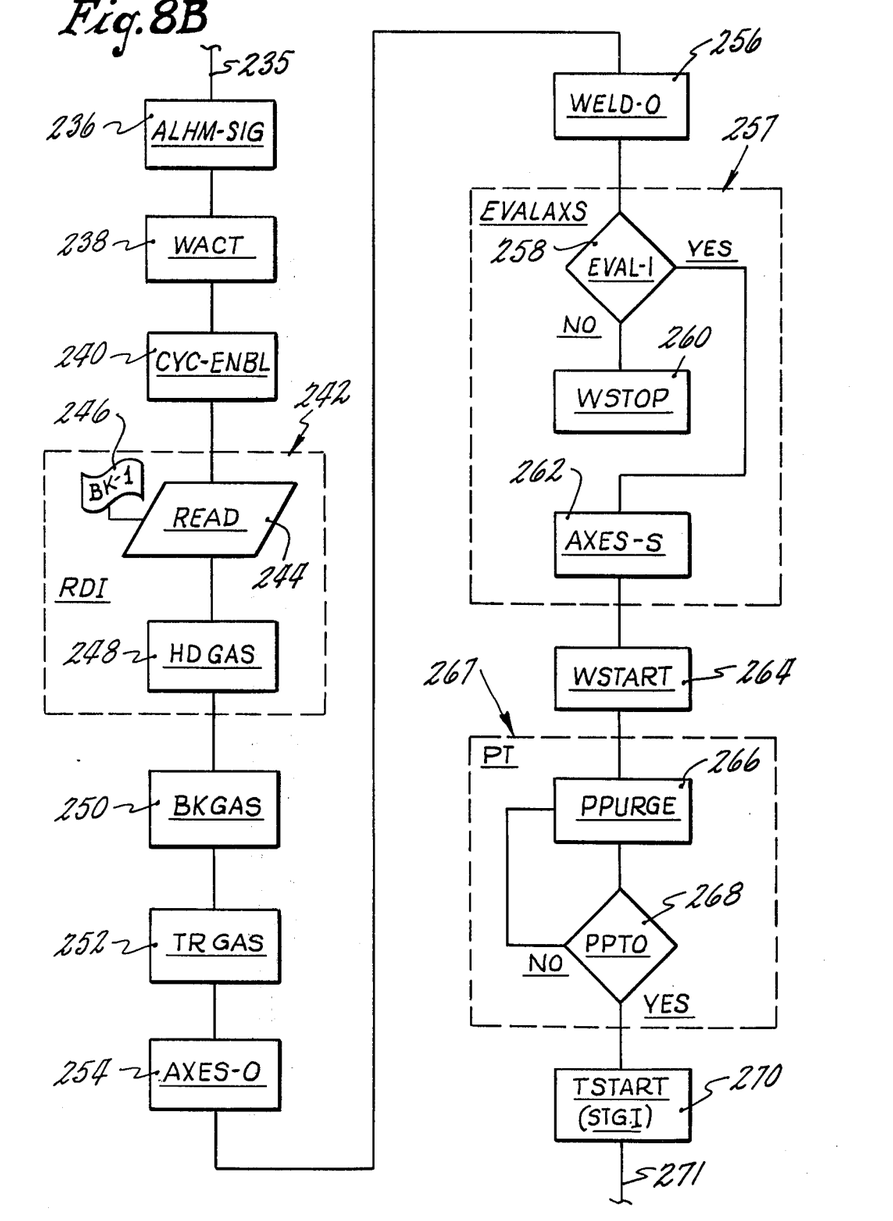
Figure 8C:
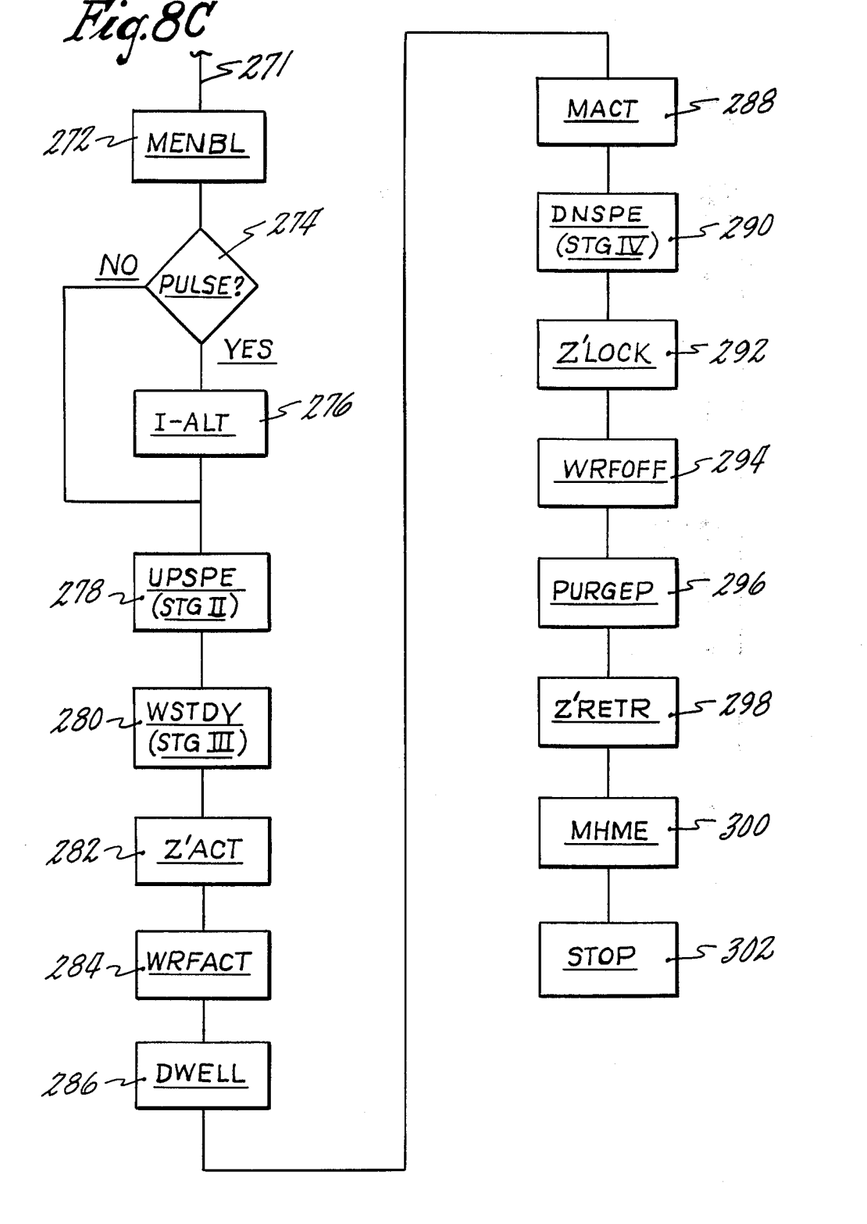

FIG. 8 is simplified summary flow chart diagram showing the essential steps in the operation of the MNC and MCP processors when carrying out the functions of the welding system. The process begins at step 200 (ENTER), and at step 206 (ACT-SYS) the processors are initialized. Next, step 208 (FLTDET,) a determination is made of whether any circuit faults exist. If they do (YES) the sequence dtops (ENDOP) 210. If no faults are detected (NO), in step 212 (PACT) power is made available to the actuators. Next subroutines 214-222, (HPZ', HPZ, HPC, HPX, and HPY) are sequentially executed. Generally, the subroutines are intended to assure respectively that the servomechanisms and mechanical elements (HARC, CARZ, CARY, CARX, AVC-Z') associated with the x, y, z, z' and c motions are at their "home" or zero positions. The subroutines are similar and are typified by subroutine HPY, which is shown in more detail, and is comprised of steps 223-234. At step 223 (Y=0), the position of the y axis carriage CARY 26 is sensed, to determine if it is at its home position. If it is (YES), step 232 is carried out, as described below. If it is not (NO), following instruction 224 (YSYS-ON) the operator switches the system to the y axis servo system, thereby providing y axis power control. At step 226 (HMSIG) the y axis home flagging circuit is disabled, turning off a visual display. Then at step 228 (YHMPBO) the operator initializes the y axis motion, such as by holding a push button, whereupon at step 230 (YHMTRVL) the appropriate y axis motion toward the home position is caused to take place. When the y axis carriage reaches mechanical home, a repetition of step 223 produces a YES, with the result that at step 232 (YHMSIG) the home position is sensed, the home flag display is reactivated, and y axis motion stops. Then at step 234, (YPBREL), the operator terminates the homing signal to the y axis servo system. Step 236 provides a signal flag 236 (ALHM-SIG) when all the subroutines 214-222 are completed, indicating all the axes are at their home positions.

Next, the operator starts to initiate the actual welding sequence, and the MNC 502 and the MCP 538 processors are thus put into automatic weld mode at step 238 (WACT). The actual sequence is initiated at step 240 (CYC-ENBL) after the operator so commands. The MNC then commences to read the punched tape input, block by block, at subroutine 242 (RD1) which typifies subsequent subroutines 250-256. Referring to subroutine 242, the first block of data 246 (BK1) is read at step 244 (READ) and step 248 (HD GAS) the inert shield gas supply is made available for the weld head. Not shown are appropriate confirming displays which are made after each subroutine. As a particular function is being carried out the next block of data is being read. Thus, at step 250 (BK GAS), inert gases are made available for the backup shoe 43 on the underside of the weldment; at step 252 (TR GAS), inert gas is made available for the trailer 45; and, at step 254 (AXES-0) the servomechanisms CARZ 26, CARY 28, HARC 32, are moved to their start positions from home. Simultaneously data are received by reading the initial weld parameters at step 256 (WELD-0).

At subroutine 257 (EVLAXS) the weld parameter instructions are evaluated at step 258 (EVAL-1) to ascertain if they are within tolerance; if not (NO) the sequence stops, 260 (WSTOP); if they are (YES) the servomechanisms position the weld head at its x, y, z and c axes at step 262 (AXES-S). Evaluations, not shown, similar to the subroutine 257 are performed for the other welding and position parameters. When all instructions are found within the tolerance of the machine, the sequence starts at step 264 (WSTART). In subroutine 267 (PT), by step 266, (PPURGE) prepurge gas, or gas sufficient to clear non-inert gas from the gas lines, is caused to flow to the various inert gas receiving components. It is maintained for a period of time, which is evaluated at step 268 (PPTO) for completion (YES). Whereupon, at step 270 (TSTART) the weld head is moved by the servomechanism CARZ 26 along the z axis, to initiate the welding arc 44 by causing the welding head electrode to touch and then move away from the workpiece 20. Thereafter, the weld head moves to the z axis position corresponding to the initial arc gap weld parameter instruction from step 256. When the arc is evaluated as stabilized at the Stage I parameters (using a timing out evaluation similar to that of subroutine 267), at step 272 (MENBL) the MNC permits travel along the x, y, z and c axes. When Stage I is timed out (not shown) Stage II commences. Upon entering Stage II parameters, an evaluation 274 (PULSE?) is made to determine if pulsing is to be used. If not (NO), the sequence continues at step 278 (UPSPE). If pulsing is required (YES) according to previously read weld parameter instructions, at step 276 (I-ALT) the current is pulsed. Next at step 278 (UPSPE) the Stage II parameters are applied, and the current increases linearly (or as otherwise chosen) with time, while the weld head is moved away from the work along the z axis. After the step 278 time is determined to have ended, the weld parameters move to Stage III, the steady state conditions, at step 280 (WSTDY).

At this point the servo AVC-Z' 576 is activated at step 282 (Z'ACT), giving axis motion, to be superimposed on any subsequent z axis motion. At step 284 (WRFACT) the wire feed WRF 574 is started. As the arc current reaches its peak, there is a delay in all axes' motion at step 286 (DWELL) to enable the arc to penetrate through the workpiece. When the delay is timed out, at step 288 (MACT) the weld head is caused to follow its predetermined path by x, y, z, and c motions.

When the traversing of the weld joint has satisfactorily been completed to accomplish the desired welding, at step 290 (DNSPE) the downslope or finishing parameters are implemented. Essentially, these are the obverse of the upslope or starting parameters. The current diminishes until the arc automatically extinguishes, and the AVC-Z' motion along z' axis is locked at step 292 (Z'LOCK); the wire feed is stopped at step 294 (WRFOFF). The motion along the axes may be stopped during or after the step 290 (DNSPE) and the weld head stops over the workpiece near the point of last arcing. Inert gas flow is continued through the various gas receiving components during a post purge step 296 (PURGEP).

After completion of the post purge time, the AVC-Z' is commanded at step 298 (Z'RETR) to retract the weld head from the workpiece. Thereafter at step 300 (MHME) the weld head is commanded to move along the x, y, c and z axes, to its home position. Upon reaching home, the appropriate signals showing completion of the cycle are given and the system is now re-enabled, at step 302 (STOP).

Although this invention has been shown and described with respect to a preferred embodiment, it will be understood by those skilled in the art that various changes in form and detail thereof may be made without departing from the spirit and scope of the claimed invention.

We claim:

1. Apparatus for arc welding a workpiece comprising
   a base, for supporting a slide and carriage assembly and the workpiece;
   a carriage, movably attached to the base, adapted to move along x, y, and z axes;
   means for moving the carriage in x, y, and z axis directions; characterized by
   a welding head, movably attached to the carriage, adapted to move with z' motion along the z' axis, and with c rotational motion about the z axis, both motions relative to the carriage;
   means for moving the welding head in the z axis direction independently of any motion of the carriage;
   means for moving the head with c rotational motion with respect to the carriage; and
   means for controlling said multiple means for moving the head and carriage, to thereby enable the head to trace a complex path in x, y, and z directions above the workpiece surface.

2. The apparatus of claim 1 further characterized by means for moving the welding head and carriage which include
first drive means, for causing the z' motion of the welding head, the drive means being responsive to a signal derived from the welding arc voltage;
second drive means, for causing the c rotational motion of the head; and
third, fourth and fifth drive means, for causing the x, y, and z motions of the carriage; all said drive means capable of independent operation.

3. The apparatus of claim 2 further characterized by a filler wire feed unit, and a trailer gas shield, both fixedly mounted with respect to the head.

4. The apparatus of claim 2 further characterized by a first processor (MCP), for controlling z' motion and welding parameters supplied to the welding head and a second processor (MNC), for signaling the MCP, and controlling x, y, and z motions of the carriage, and c motion of the head.

5. The apparatus of claims 1 or 4 characterized by a workpiece holder movably mounted on the base, the holder adapted to move in the x and y directions, and to enable rotation of the workpiece about at least one axis of x, y, or z.

6. The apparatus of claim 5 further characterized by a workpiece holder which is adjustable to enable rotation of the workpiece about two axes selected from x, y, and z.

7. The method of arc welding a joint on the surface of a workpiece having a complex three dimensional x, y, and z axis surface contour, using an arc welding head movably mounted on a movable carriage, characterized by:
moving the carriage along a predetermined x, y, and z axis path, generally following the path of the weld joint;
moving the head with z' motion along the z axis relative to the carriage to control the arc length; and
rotating the welding head with c motion about a z' axis, to orient a wire feed unit attached thereto for proper wire feed into the welding arc zone between the head and the workpiece.

8. The method of claim 7 further characterized by
controlling the z' motion of the head and the weld parameter schedule with a first processor (MCP);
controlling the MCP, the x, y, z motions of the carriage and the c motion of the head, with a second processor (MNC).

9. The method of claim 8 further characterized by causing a laser mounted parallel to, but offset from, the welding head, to impinge its beam on the weld joint while the weld head traces the MCP programmed x-y path at an offset position, to visually verify the MCP is programmed correctly prior to actually arc welding.

10. The method of claims 7 or 8 further characterized by moving the workpiece in the x-y plane and rotating the workpiece about at least one of the x, y, or z axes, to position different parts of the workpiece in proximity to the head.

* * * * *

UNITED STATES PATENT AND TRADEMARK OFFICE
CERTIFICATE OF CORRECTION

PATENT NO. : 4,418,266

DATED : November 29, 1983

INVENTOR(S) : William H. Rosenbeck et al

It is certified that error appears in the above-identified patent and that said Letters Patent is hereby corrected as shown below:

Column 12, line 59 before "axis", change "z'" to --z--

Column 12, line 60, change "z" to --z'--

Signed and Sealed this

Fourteenth Day of February 1984

[SEAL]

Attest:

GERALD J. MOSSINGHOFF

Attesting Officer

Commissioner of Patents and Trademarks